United States Patent
Brown

(10) Patent No.: US 8,632,292 B2
(45) Date of Patent: Jan. 21, 2014

(54) RETRACTABLE CRANE BUILT INTO HYBRID TRAILER LOAD BED

(76) Inventor: Ronald Lynn Brown, Brooklyn, NY (US)

( * ) Notice: Subject to any disclaimer, the term of this patent is extended or adjusted under 35 U.S.C. 154(b) by 527 days.

(21) Appl. No.: 12/490,314

(22) Filed: Jun. 24, 2009

(65) Prior Publication Data

US 2009/0317220 A1 Dec. 24, 2009

Related U.S. Application Data

(60) Provisional application No. 61/129,397, filed on Jun. 24, 2008.

(51) Int. Cl.
*B60P 1/54* (2006.01)

(52) U.S. Cl.
USPC ........... 414/486; 414/498; 414/732; 212/180; 212/300

(58) Field of Classification Search
USPC ................. 212/180, 243, 259, 282, 294, 300; 414/732, 486, 491
See application file for complete search history.

(56) References Cited

U.S. PATENT DOCUMENTS

| | | | | |
|---|---|---|---|---|
| 2,951,601 A * | 9/1960 | Castoe | ........................... | 414/563 |
| 3,253,716 A * | 5/1966 | Stratton | ........................ | 212/300 |
| 3,743,044 A | 7/1973 | Scheele | | |
| 3,811,581 A * | 5/1974 | Van Der Lely | ............... | 414/686 |
| 4,078,818 A * | 3/1978 | Donnelly | .................... | 280/418.1 |
| 4,249,843 A | 2/1981 | Kerr | | |
| 4,519,768 A * | 5/1985 | Murai et al. | ................... | 425/456 |
| 4,552,501 A * | 11/1985 | Clark et al. | .................... | 414/486 |
| D331,413 S | 12/1992 | Danner | | |
| 6,547,506 B1 * | 4/2003 | Jacob | ........................... | 414/498 |
| 6,966,448 B1 * | 11/2005 | Burkett | ........................ | 212/180 |
| 7,195,296 B2 * | 3/2007 | Swift et al. | ................. | 294/68.24 |
| 7,878,750 B2 * | 2/2011 | Zhou et al. | .................... | 414/498 |
| 8,079,799 B2 * | 12/2011 | Rathbun et al. | ............... | 414/626 |
| 2004/0066052 A1 | 4/2004 | Payne | | |
| 2005/0098524 A1 * | 5/2005 | Irsch et al. | ..................... | 212/300 |
| 2005/0226707 A1 | 10/2005 | Quenzi et al. | | |
| 2009/0145871 A1 * | 6/2009 | Bond | ........................... | 212/285 |

\* cited by examiner

*Primary Examiner* — James Keenan
(74) *Attorney, Agent, or Firm* — Middleton Reutlinger; Alexander P. Brackett

(57) ABSTRACT

A hybrid trailer with a built in retractable hydraulic crane to handle different configurations of platform surface bodies. It will raise the platform surface body vertically away from the chassis frame placing the platform surface body in the desired location. Two telescoping arms extend out to lift and retract into a recessed area in the bed of the trailer for storage. It is operated by remote voice control. A solar collector enables operation in remote locations and use of the crane for external lifting operations.

7 Claims, 10 Drawing Sheets

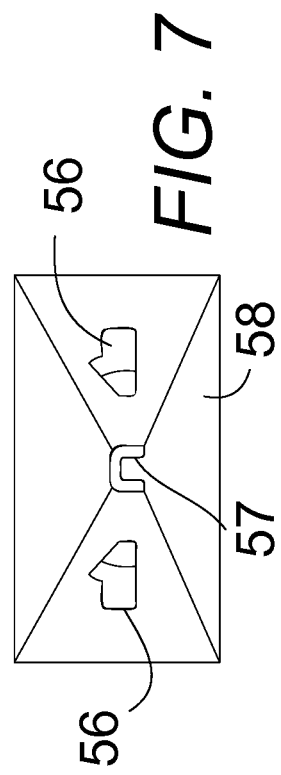
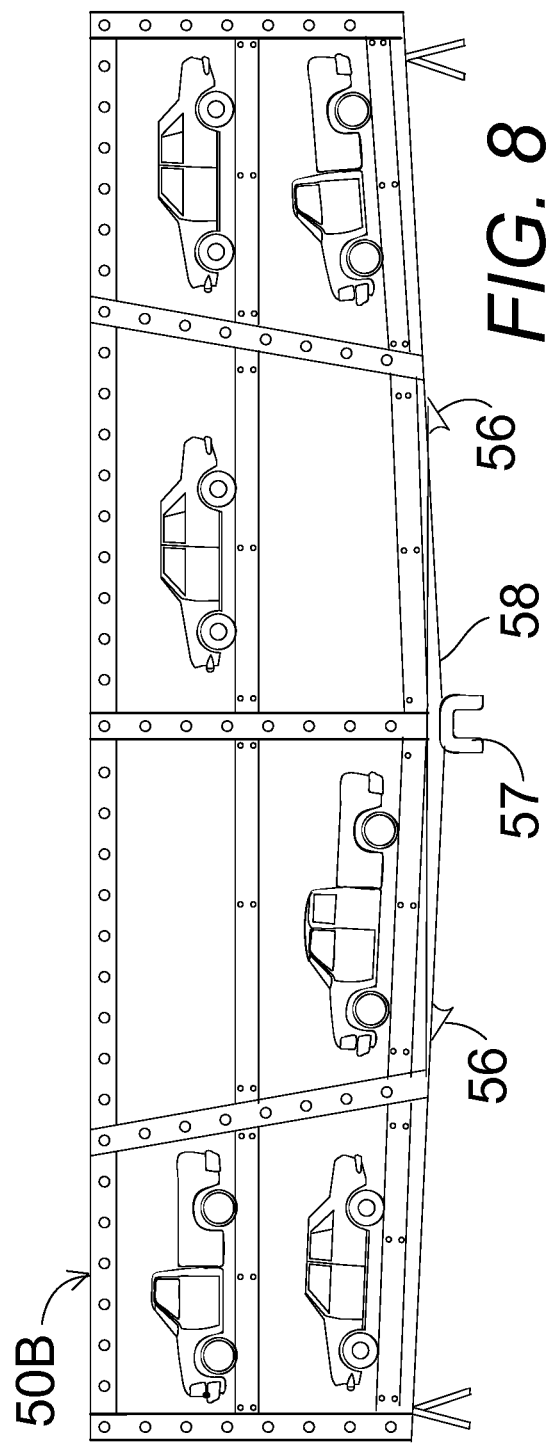

US 8,632,292 B2

RETRACTABLE CRANE BUILT INTO HYBRID TRAILER LOAD BED

CROSS-REFERENCE TO RELATED APPLICATIONS

The present utility patent application claims the benefit of provisional application No. 61/129,397 filed Jun. 24, 2008.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to loading equipment for trailers, and particularly to a mobile telescoping crane system built into a recessed storage area in a bed of a hybrid trailer for lifting, loading, and unloading a variety of types of load boxes and tanks onto and off of the trailer, with remote voice control and solar power systems to enable operation in remote locations, including usage as a crane for other purposes.

2. Description of Related Art Including Information Disclosed Under 37 CFR 1.97 and 1.98

Loading and unloading trailers, especially with containers or tanks holding all of the load requires heavy lifting and moving equipment. Having the lifting and moving equipment built into the hauling trailer would enable use at any location.

The present invention relates to other inventions in the field of commercial semi-trailers, such as U.S. Pat. Nos. 4,249,843, 3,743,044, and 6,966,448. But the prior art patents fail to provide a built in versatile mobile extensible crane with remote use capabilities and ease of use.

U.S. Patent Application No. 2005/0226707, filed Mar. 9, 2004 by Quenzi, et al, indicates a trailer for carrying cargo that includes a frame, at least two axles mounted to the frame, and a deck. The axles have wheels at opposite ends of the axles for movably supporting the frame above the ground. The deck is pivotally mounted to the frame and is pivotable about a first axis relative to the frame and a second axis relative to the frame via at least two supports. The first axis extends generally longitudinally along the deck and the second axis extends generally laterally across the deck and generally normal to the first axis. The deck is also slidable generally along the first axis relative to the frame and/or one of the supports. The deck thus may be adjusted about multiple axes and may be moved forwardly or rearwardly relative to the frame to position the deck in a desired location and orientation relative to the frame.

U.S. Pat. No. 4,249,843, issued Feb. 10, 1981 to Kerr, puts forth an apparatus for loading, unloading and stacking hay bales utilizing a load carrying vehicle with an elevatable and tiltable bed and a powered headboard or pusher means mounted on the bed capable of traversing the length of the bed; and an independently powered tine structure generally coextensive with but longer than the bed and extendable to protrude beyond the end of the bed an extent generally equal to the bed length and being supported cantilever fashion by the bed.

U.S. Pat. No. 3,743,044, issued Jul. 3, 1973 to Scheele, is for an article transport vehicle for loading and unloading cargo aircraft that has an elevating article-supporting bed which carries on its underside power means for adjusting the disposition of the bed and power means for motivating the vehicle. The bed is uniquely supported on tandem wheel-carrying axles so that it can be elevated to any desirable level and still be stabilized with respect to vertical, side, or fore and aft loads. The bed also possesses roll and pitch capabilities for use on uneven terrain.

U.S. Patent Application No. 2004/0066052, filed Feb. 20, 2001 by Payne, describes a cargo storage system, e.g. of a road freight semitrailer that comprises a rectangular base with telescopic support masts. The support masts, by means of height adjustment tables and a rectangularly orientated support cable, are adapted to support a box-shaped flexible cover in a raised position over the base. The support masts may be retracted and/or the height adjustment cables released to lower the cover may engage against cargo loaded on the base. The cover includes a grid pattern of webbing straps integral therewith, which may be tensioned down so that the cover engages against and bears down upon the cargo to restrain the cargo in position. The cover is removable and foldable and the masts removable for stowage thereof. The invention is also applicable to rigid vehicle, full trailer, intermodal and other freight applications.

U.S. Pat. No. 6,966,448, issued Nov. 22, 2005 to Burkett, is for a trailer-mounted crane apparatus that includes a trailer supported from a ground surface on at least two wheels. A hydraulically operated crane arm is mounted to the trailer and is extendable outwardly. A crane hydraulic power unit is mounted to the trailer and supplies pressurized hydraulic fluid to the crane arm. A vibrational sheet piling driver can be supported by the crane arm. A vibrational hydraulic power unit for supplying power to the driver is mounted on the trailer. A control panel for the crane hydraulic power unit and the vibrational driver hydraulic power unit, and an associated operator's seat, are also mounted on the trailer. The crane apparatus includes wide tires for reducing the surface pressure under the apparatus. This allows the apparatus to be transported across and used on delicate surfaces such as golf course greens and other groomed surfaces.

U.S. Design Pat. No. D331,413, issued Dec. 1, 1992 to Danner, discloses an ornamental design for a hay trailer, What is needed is a mobile telescoping crane system built into a recessed storage area in a bed of a hybrid trailer for lifting, loading, and unloading a variety of types of load boxes and tanks onto and off of the trailer, with remote voice control and solar power systems to enable operation in remote locations, including usage as a crane for other purposes.

BRIEF SUMMARY OF THE INVENTION

An object of the present invention is to provide a mobile telescoping crane system built into a recessed storage area in a bed of a hybrid trailer for lifting, loading, and unloading a variety of types of load boxes and tanks and auto carriers onto and off of the trailer, with remote voice control and solar power systems to enable operation in remote locations, including usage as a crane for other purposes.

In brief, a mobile telescoping crane system is pivotally secured to into a recessed storage area in a bed of a hybrid trailer and hydraulically lifted out and pivoted for lifting, loading, and unloading a variety of types of load boxes and tanks onto and off of the trailer, with remote voice control and solar power systems to enable operation in remote locations, including usage as a crane for other purposes the present invention have a obtuse angle design with eagle wings appearance. This is the key structural focus of this versatile trailer. It will be able to handle all types of cargo, by different configuration surface platform bodies. The versatile semi-trailer is made up of three set applications in its unique approach to the trailer market. It's stand alone is in its own class, bringing consummation to the missing element in the semi-trailer world; the versatile trailer will have adjustable leg arms support attached at the end of the trailer. The portable trailer will have built inside one retractable crane apparatus. Preferably, an audible voice remote control system will control and pivot the retractable crane apparatus. The chassis frame will have two adjustable support arm legs at each end of the trailer chassis frame.

The advantage of the present invention is that it provides a completely mobile retractable crane housed in a storage area below the trailer bed of a hybrid trailer.

Another advantage of the present invention is that it can be used for loading and hauling a wide variety of different load types including boxes and tanks and vehicle transporters

BRIEF DESCRIPTION OF THE SEVERAL VIEWS OF THE DRAWINGS

These and other details of the present invention will be described in connection with the accompanying drawings, which are furnished only by way of illustration and not in limitation of the invention, and in which drawings:

FIG. 7 is a schematic bottom plan view of a car hauler receiving structure for mounting on the hybrid trailer bed of the present invention;

FIG. 8 is a schematic side elevational view of a car hauler surface body platform for mounting on the hybrid trailer bed of the present invention;

DETAILED DESCRIPTION OF THE INVENTION

Figure 1:
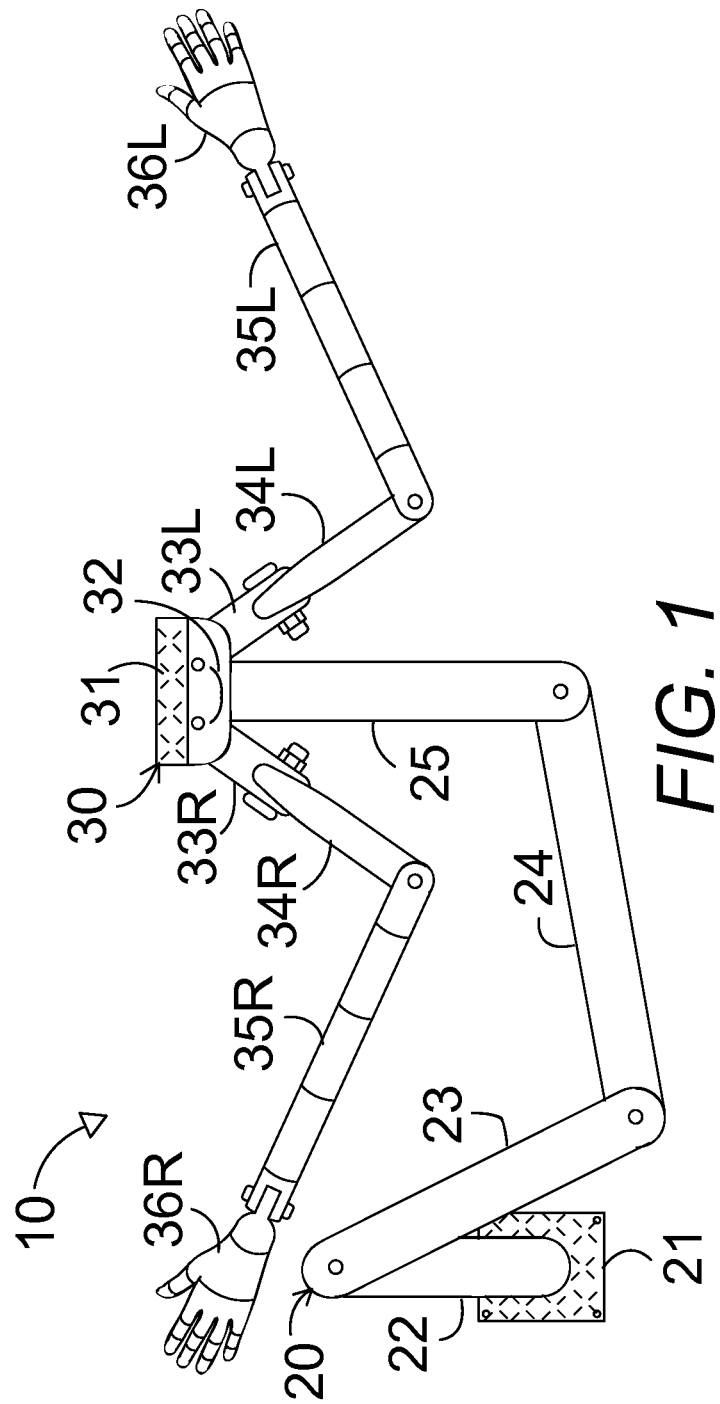
FIG. 1 is a schematic side elevational view of the retractable built in crane of the present invention.
Figure 2:
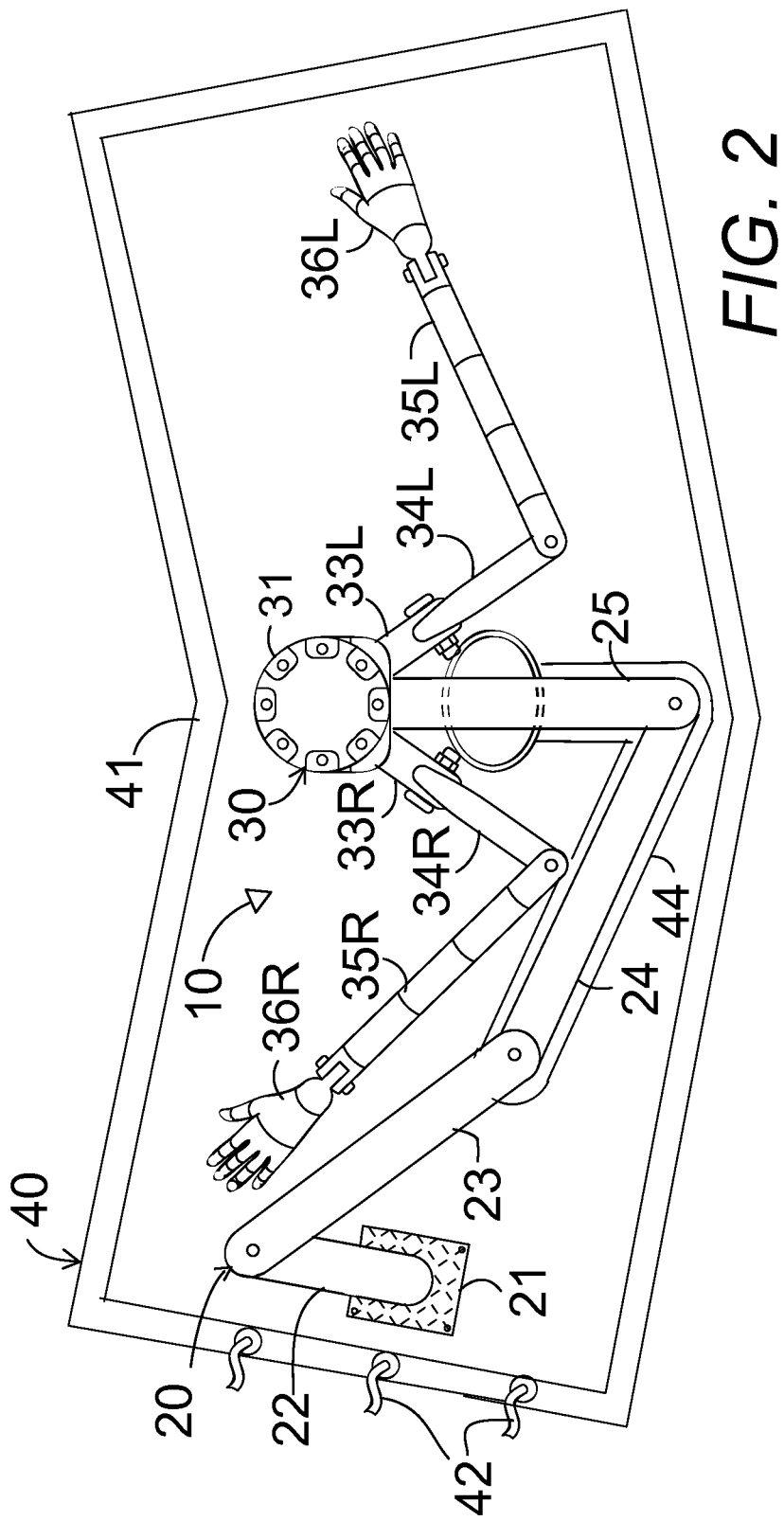
FIG. 2 is a schematic plan view of the retractable built in crane of the present invention showing the crane mounted on the trailer.
Figure 3:
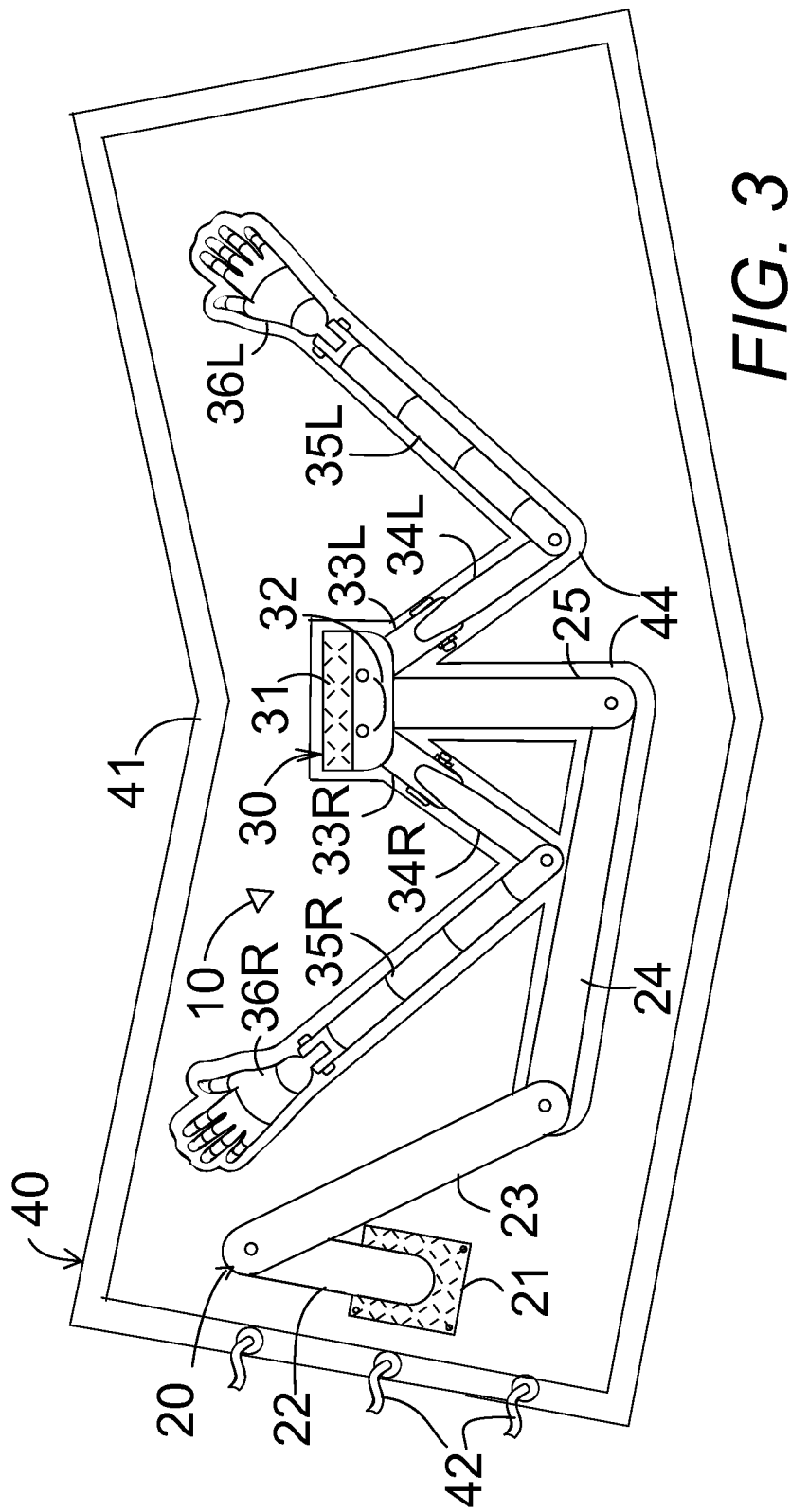
FIG. 3 is a schematic plan view of the retractable built in crane of the present invention showing the crane in the recessed storage areas of the trailer bed.
Figure 4:
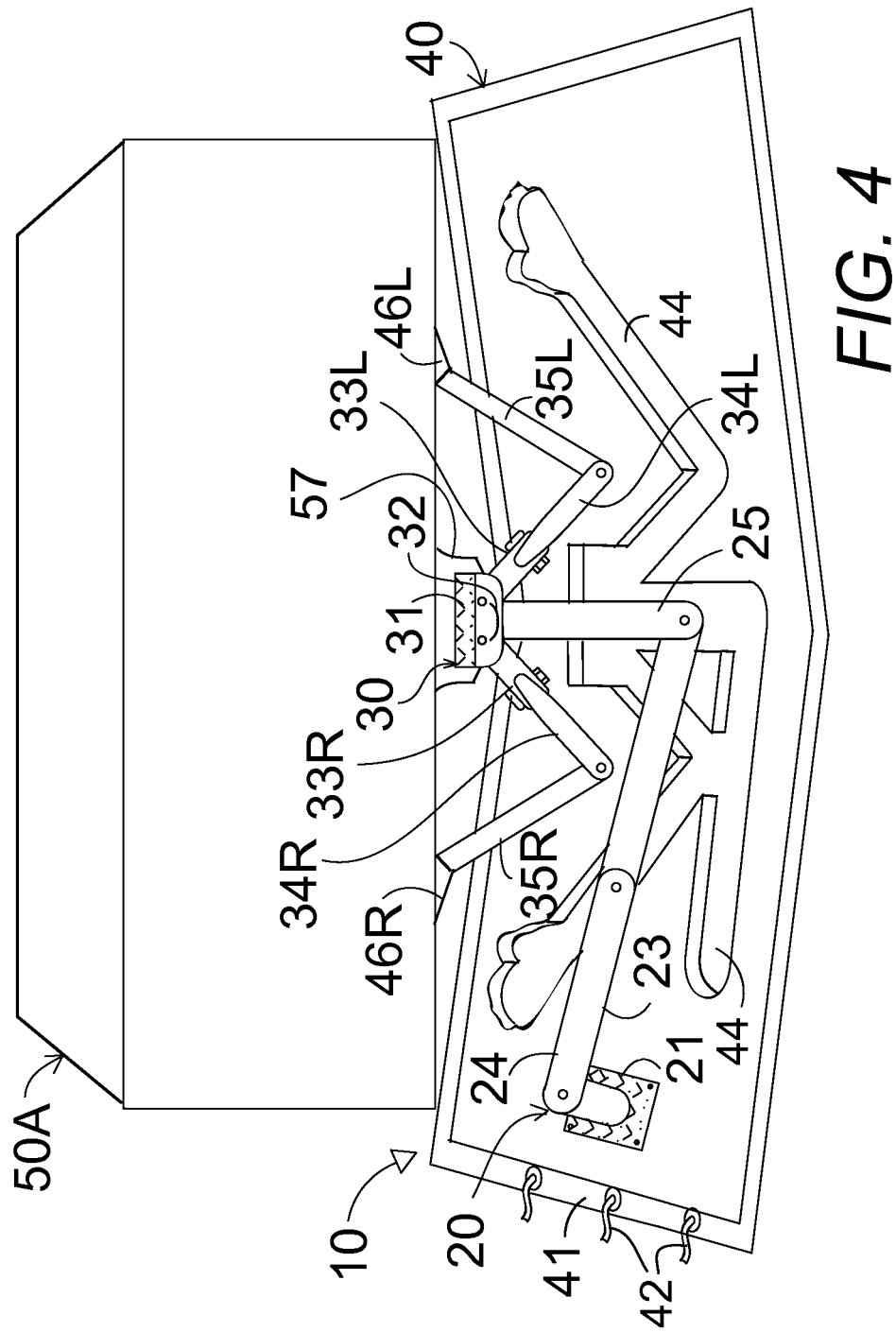
FIG. 4 is a schematic perspective view of the retractable built in crane of the present invention showing the crane mounted on the trailer and lifting a load box above the trailer bed.

In FIGS. 1-14, a retractable crane apparatus 10 is built into a bed 41 of a hybrid trailer 40. The crane apparatus comprises a hybrid trailer 40 comprising a bed 41 for receiving loads thereon and a recessed storage area 44 in the bed. A hydraulic base 21 is mounted on a forward end of the hybrid trailer to provide the hydraulic power for a crane apparatus 20. The crane apparatus comprises a boom assembly with pivotally connected boom arms 22, 23, 24, and 25 pivotally attached to the hydraulic base to extend outwardly from the base at variable distances and angles. A crown chapter 30 on an outer end of the boom assembly houses the controls for the crane apparatus. A pair of lift arms 33L, 34L, 35L, 36L and 33R, 34R, 35R, 36R are pivotally attached to the crown chapter 30 for lifting load bodies 50A-50D onto and off of the trailer bed 41 and for general use as a crane. The lift arms crown chapter 30, and boom assembly extend upwardly and outwardly for lifting loads and alternately retracting down below the upper surface of the bed 41 for storage in the recessed storage area 44 in the bed. A remote control enables wireless communication with the controls for the crane apparatus to operate the crane apparatus. An electric power source powers the crane apparatus.

Figure 5:
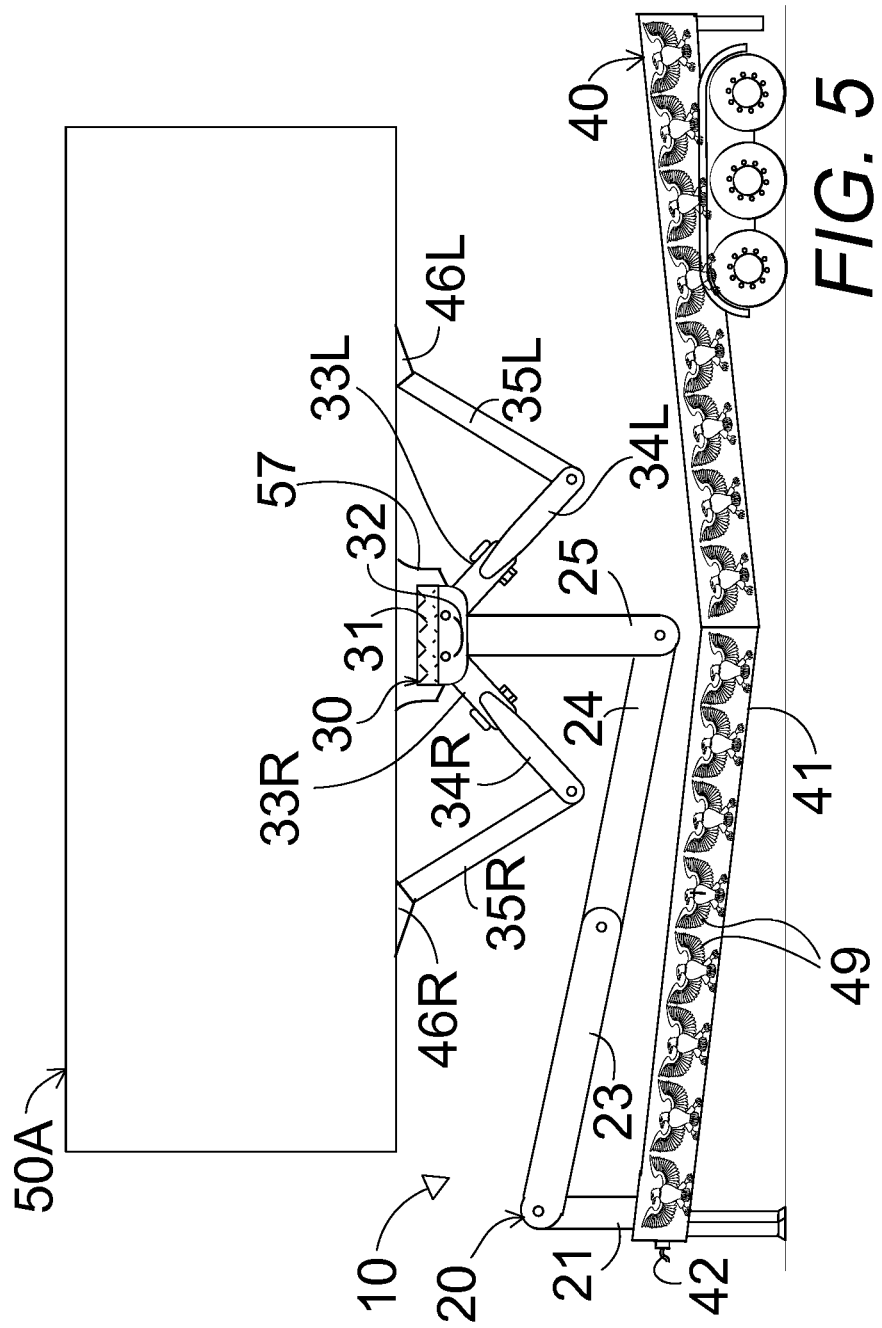
FIG. 5 is a schematic side elevational view of the retractable built in crane of the present invention showing the crane mounted on the trailer and lifting a load box above the trailer bed and showing the solar panels on the side edge of the bed in the shape of eagle logos.
Figure 6:
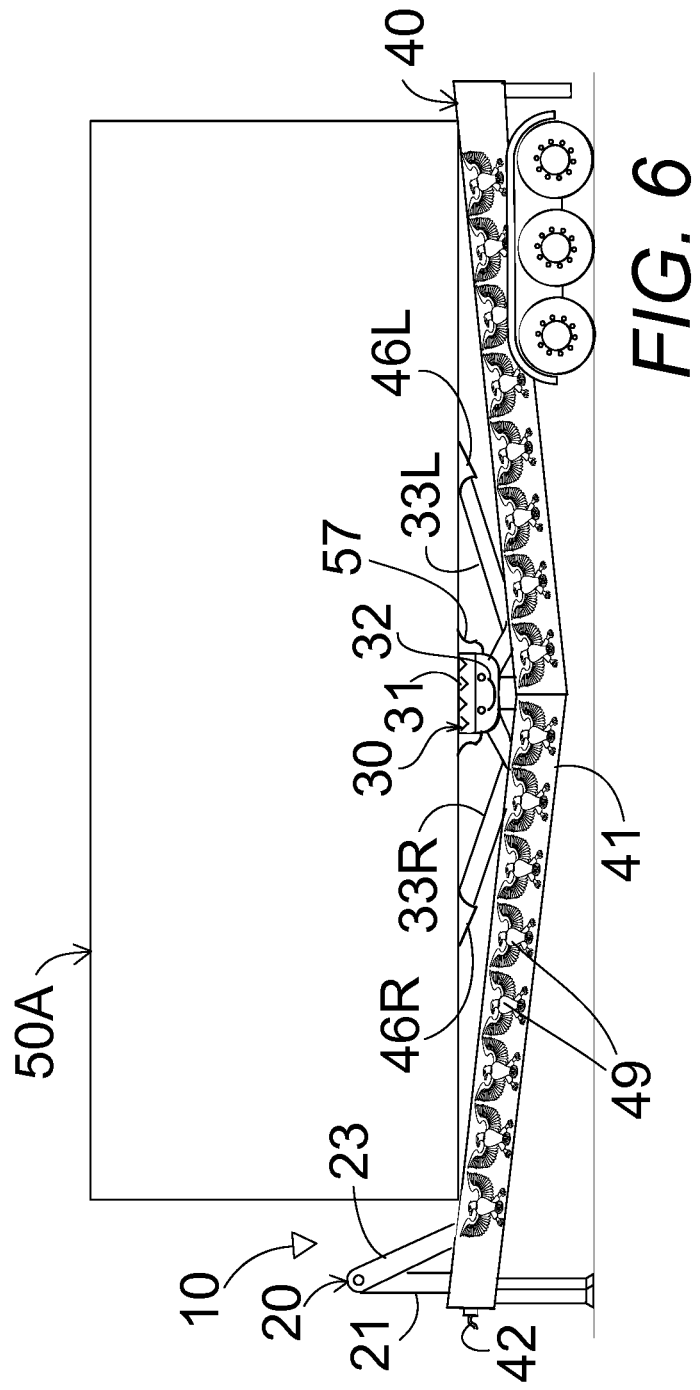
FIG. 6 is a schematic side elevational view of the retractable built in crane of the present invention showing the crane mounted on the trailer with a load box in place on the trailer bed above the present invention and showing the solar panels on the side edge of the bed in the shape of eagle logos.
Figure 9:
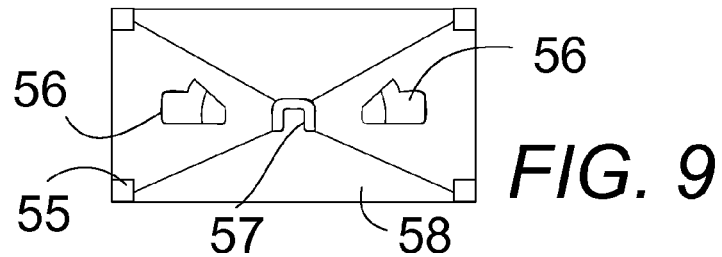
FIG. 9 is a schematic bottom plan view of a car hauler receiving structure mounted on the hybrid trailer bed of the present invention.
Figure 10:
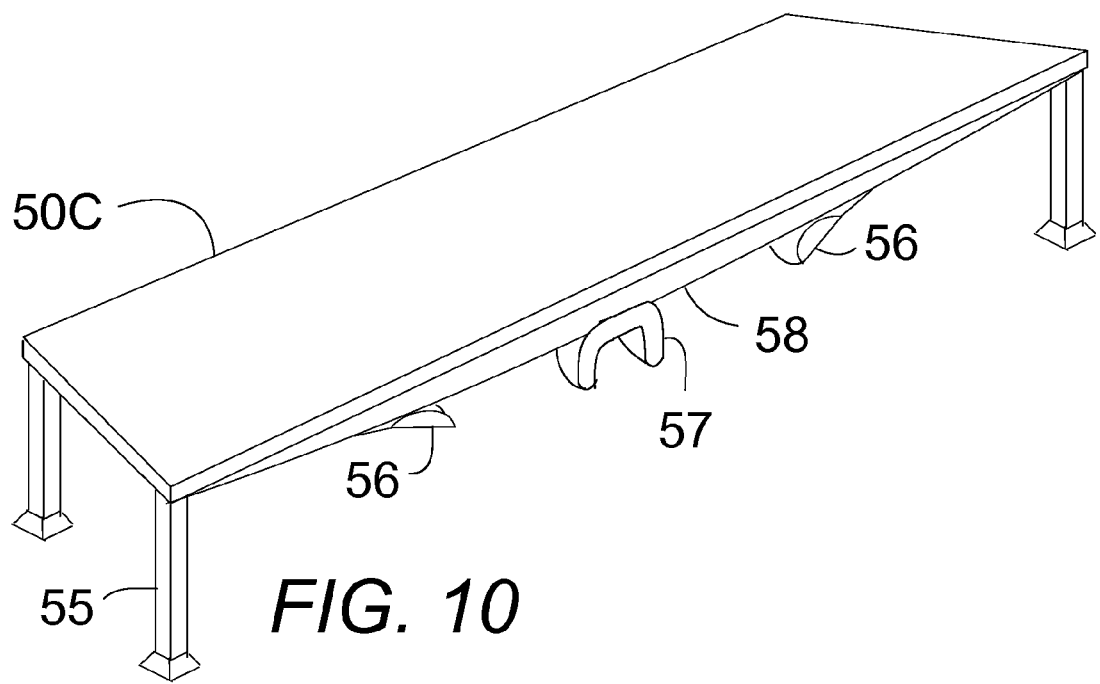
FIG. 10 is a schematic perspective view of a car hauler receiving structure mounted on the hybrid trailer bed of the present invention.
Figure 11:
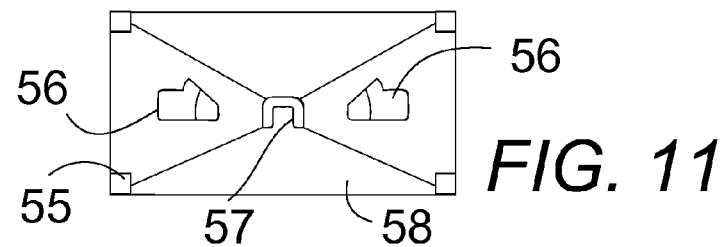
FIG. 11 is a schematic bottom plan view of a tank receiving structure for mounting on the hybrid trailer bed of the present invention.
Figure 12:
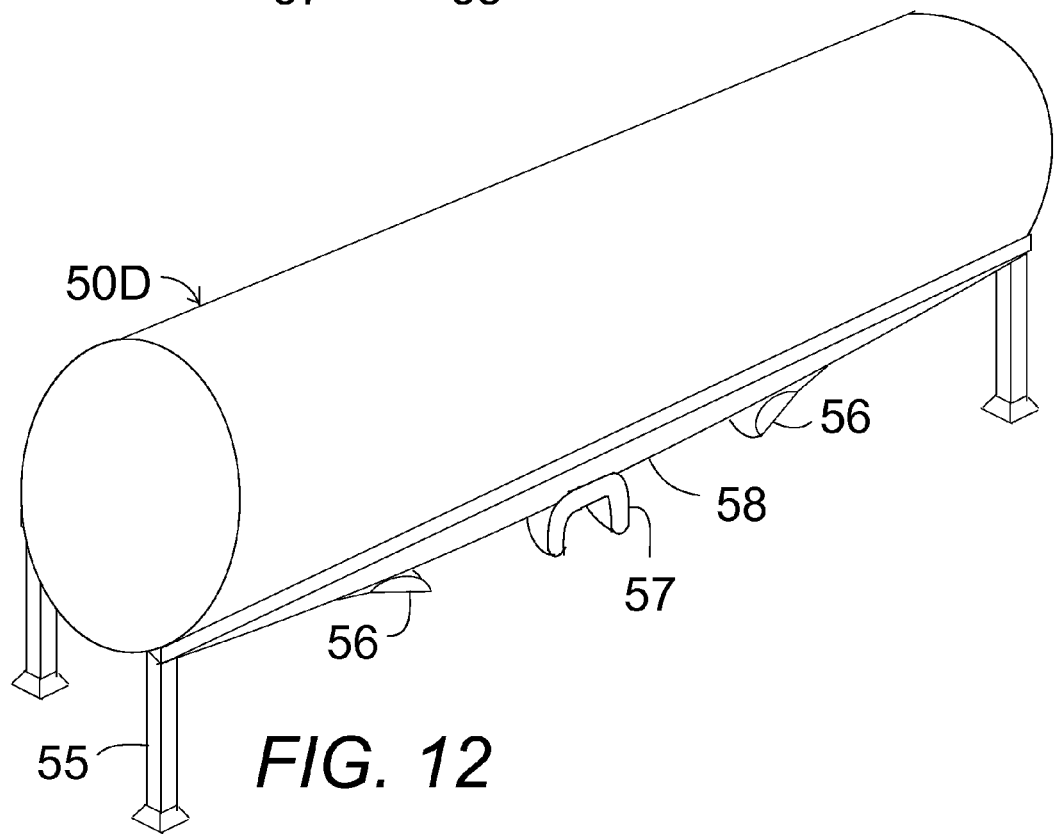
FIG. 12 is a schematic side elevational view of a surface body tank for mounting on the hybrid trailer bed of the present invention.

The electric power source may comprise, in addition to the truck's power source through cables 42 or as an alternative, a plurality of solar energy panels, such as the solar energy panels in the shape of logos (eagles in this example) 49 along the side edge of the hybrid trailer 40, as in FIGS. 5 and 6, or solar panels 70 mounted on the back center flap 45 of the hybrid trailer 40 or other solar collectors mounted on a tractor and the hybrid trailer or on the load bodies 50A-50D for powering the crane apparatus and enable use of the crane apparatus in remote locations without power from the truck motor or an external source.

The remote control may comprise a voice activated remote control device communicating with the controls in the crown chapter 30.

The crown chapter 30 also has a steel top 31 for engaging a straddling yoke 57 on a load body for engaging the crown chapter 30 during loading and during transport.

The boom assembly comprises a series of pivotally connected elements 22, 23, 24, and 25 forming a boom hydraulic extension which extends out and retracts itself. The boom assembly is fabricated light aluminum steel, flex steel, and hardenable steel constructed together.

The lift arms 33L, 34L, 35L, 36L and 33R, 34R, 35R, 36R comprise two hydraulic sections attached by a pivot each resembling an arm having a hand 36L and 36R pivotally attached on an outer end of the arm.

The chassis frame portion of the trailer comprises at least two axles, mounted to the frame, and it will have low profile tires and aluminum alloy wheels, with two air ride bags between each axle, and spring suspension for rolling support, said chassis frame connected to one or more load bodies, and adjustable portable leg arms 55 attached at each corner of the chassis frame with two in the front end and two in the rear end of the frame.

The structure will be made with an obtuse angle. Each configuration will have this obtuse angle design, between 141-161 degrees. In the center of the obtuse angle will be the bottom wheel or straddling yoke 57. This is where the connection takes place between the bottom wheel and the crown chapiter 30. On opposite sides of the straddling yoke 57 are pockets gloves 46R, 46L and 56. These pocket gloves 46R, 46L and 56 engage the hands 36R and 36L and the bottom straddling yoke 57 engages the crown chapiter 30. Once this takes place the body platform can be lifted from the chassis frame, placing the platform to the desired area.

Figure 13:
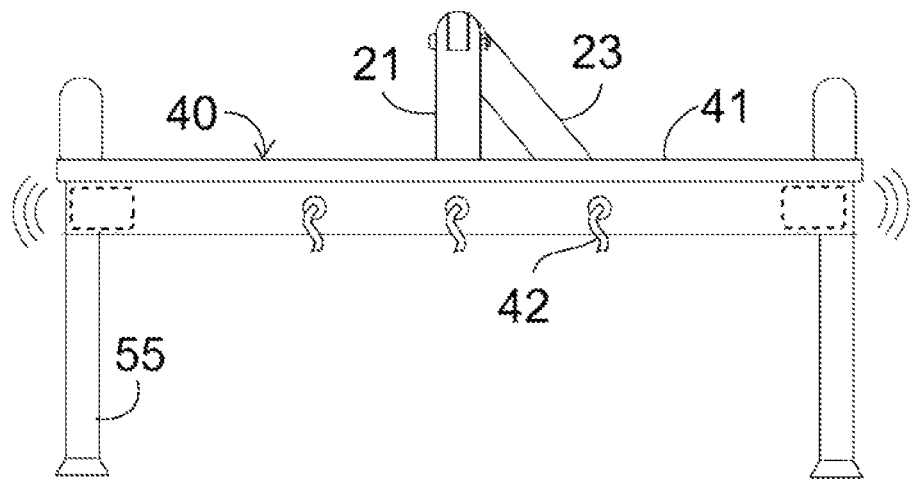
FIG. 13 is a schematic front end elevational view of the hybrid trailer with the retractable built in crane of the present invention showing the crane mounted on the trailer.
Figure 14:
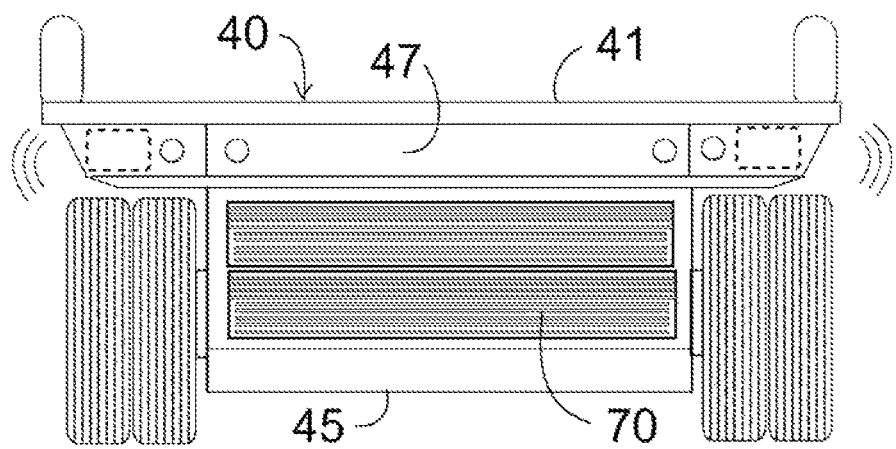
FIG. 14 is a schematic back end elevational view of the hybrid trailer with the retractable built in crane of the present invention showing the crane mounted on the trailer.

FIG. 13 shows, from a front view, an embodiment of the hybrid trailer 40 with the retractable built in crane 20 mounted on the trailer 40. FIG. 14 shows, from a back view, an embodiment of the hybrid trailer 40, which may include one or more solar panels 70 and/or back center flap 45, with the retractable built in crane 20 mounted on the trailer 40.

The top overview of the chassis body frame will have a engraved 2 feet deep grove trench or recessed storage area 44. This is how the crane assembly 20 is able to rest integrated below the hybrid deck 41. The retractably crane apparatus 20 has a boom extension with pivotable and extensible arms that have the ability to extend out to about 100 feet, depending on the gross weight of the cargo.

In use, the present invention provides a versatile trailer that will be able to handle different configurations and platform surface bodies. It will raise the platform surface body vertically away from the chassis frame placing the platform surface body to the desired location.

It is understood that the preceding description is given merely by way of illustration and not in limitation of the invention and that various modifications may be made thereto without departing from the spirit of the invention as claimed.

What is claimed is:

1. A retractable crane apparatus built into a bed of a trailer, the crane apparatus comprising:
    a trailer bed comprising a bed for receiving loads thereon and a recessed storage area in the bed;
    a hydraulic base mounted on a forward end of the trailer to provide the hydraulic power for a crane apparatus;
    a boom assembly pivotally attached to the hydraulic base to extend outwardly from the base at variable distances and angles;
    a crown chapiter on an outer end of the boom assembly to house the controls for the crane apparatus;
    a pair of lift arms pivotally attached to the crown chapiter for lifting load bodies onto and off of the trailer bed and for general use as a crane, the lift arms, crown chapiter, and boom assembly extending upwardly and outwardly from said trailer bed for lifting loads and alternately retracting down below the upper surface of the bed for storage in the recessed storage area in the bed;
    a remote control for wireless communication with the controls for the crane apparatus to operate the crane apparatus; and
    an electric power source for powering the crane apparatus.

2. The crane apparatus of claim 1 wherein the electric power source comprises a plurality of solar energy panels mounted on the trailer for powering the crane apparatus.

3. The crane apparatus of claim 1 wherein the remote control comprises a voice activated remote control device.

4. The crane apparatus of claim 1 wherein the boom assembly comprises a plurality of pivotally connected elements forming a boom hydraulic extension which extends out and retracts itself.

5. The crane apparatus of claim 4 wherein the boom assembly is fabricated from at least one of light aluminum steel, flex steel, and hardenable steel.

6. The crane apparatus of claim 1 wherein the lift arms comprise two hydraulic sections attached by a pivot each resembling an arm having a hand pivotally attached on an outer end of the arm.

7. The crane apparatus of claim 1 further comprising:
    a chassis frame supportively connected to one or more of said load bodies;
    at least two axles mounted to said chassis frame and a plurality of air ride bags between each axle;
    wherein said chassis frame includes spring suspension for rolling support; and
    adjustable portable leg arms attached at each corner of the chassis frame.

* * * * *